US009384293B2

(12) United States Patent  (10) Patent No.: US 9,384,293 B2
Oliver et al.  (45) Date of Patent:  Jul. 5, 2016

(54) METHODS AND DEVICES FOR FACILITATING ACCESS TO A WEBPAGE ASSOCIATED WITH A CONTACT

(75) Inventors: Robert George Oliver, Waterloo (CA); Jonathan Cha Bodtker Kidd, Guelph (CA)

(73) Assignee: BlackBerry Limited, Waterloo (CA)

( * ) Notice: Subject to any disclaimer, the term of this patent is extended or adjusted under 35 U.S.C. 154(b) by 424 days.

(21) Appl. No.: 13/583,100

(22) PCT Filed: Oct. 28, 2011

(86) PCT No.: PCT/CA2011/050676
§ 371 (c)(1),
(2), (4) Date: Oct. 25, 2012

(87) PCT Pub. No.: WO2013/059903
PCT Pub. Date: May 2, 2013

(65) Prior Publication Data
US 2013/0111317 A1    May 2, 2013

(51) Int. Cl.
*G06F 17/00* (2006.01)
*G06F 17/30* (2006.01)
(52) U.S. Cl.
CPC .............................. *G06F 17/30884* (2013.01)
(58) Field of Classification Search
CPC ................................................ G06F 17/30882
See application file for complete search history.

(56) References Cited

U.S. PATENT DOCUMENTS

| 6,804,704 | B1 | 10/2004 | Bates et al. |
| 7,548,922 | B2 | 6/2009 | Altaf et al. |
| 9,092,400 | B1 * | 7/2015 | Lin ........................ G06F 17/218 |
| 2004/0122951 | A1 | 6/2004 | Beck et al. |
| 2005/0075925 | A1 | 4/2005 | Sash |
| 2005/0232247 | A1 * | 10/2005 | Whitley et al. ............... 370/352 |
| 2005/0261011 | A1 * | 11/2005 | Scott ..................... G06Q 10/10 455/466 |
| 2005/0289468 | A1 * | 12/2005 | Kahn et al. ..................... 715/738 |
| 2007/0226632 | A1 * | 9/2007 | Erola et al. ..................... 715/739 |
| 2009/0028395 | A1 * | 1/2009 | Riionheimo .................. 382/124 |
| 2009/0031232 | A1 * | 1/2009 | Brezina et al. ................. 715/764 |
| 2009/0171979 | A1 | 7/2009 | Lubarski et al. |
| 2010/0011304 | A1 * | 1/2010 | van Os .......................... 715/762 |
| 2010/0241971 | A1 * | 9/2010 | Zuber .................... G06Q 10/10 715/753 |
| 2011/0267985 | A1 | 11/2011 | Wilkinson et al. |

FOREIGN PATENT DOCUMENTS

EP    2302515 A2   3/2011
WO  2008016936 A2  7/2008

OTHER PUBLICATIONS

PCT International Search Report and Written Opinion, relating to application No. PCT/CA2011/050676, dated Jul. 17, 2012.
Brinkmann, Martin, Mozilla Contacts, Ghacks.net, http://www.ghacks.net/2010/03/19/mozilla-contacts/, Mar. 19, 2010.

(Continued)

*Primary Examiner* — Keith Bloomquist
(74) *Attorney, Agent, or Firm* — Rowand LLP

(57) ABSTRACT

Methods and devices for facilitating access to a webpage associated with a contact are described. In one aspect, a method includes: obtaining a first contact entry; determining if the first contact entry includes a webpage identifier; and if the first contact entry includes a webpage identifier, populating a portion of a web browser with the webpage identifier included in the first contact entry.

17 Claims, 8 Drawing Sheets

(56) References Cited

OTHER PUBLICATIONS

Sony Ericsson Mobile Communications AB, Store, Edit, Share your Mobile Life, Global Website, retrieved Aug. 29, 2011.
Mozilla Labs, Contacts in the Browser, Contacts as First Class Objects in the Browser <URL:http://blog_mozilla.org/labs/2010/03/contacts-in-the-browser/>, Mar. 17, 2010, Figures 1-4.
Mozilla Labs, Contacts in the Browser 0.3 Released, <URL:http://blog.mozilla.org/labs/2010/04/contacts-in-the-brower-0-3-released/>, Apr. 22, 2010, Entire document.
EPO, European Search Report relating to application No. EP11874800.3 dated Jun. 2, 2015.
"The bookmark management tool Linkman", Apr. 9, 2011, pp. 1-132, XP055191323, Retrieved from the Internet: URL:https://web.archive.org/web20110409075831/http://www.outertech.com/downloads/linkman.pdf [retrieved on May 22, 2015] *p. 45-p. 52.
Boyce, Jim: Microsoft Outlook 2010 Inside Out > 3. Working with Contacts > 18. Creating and Managing your Contacts In: "Microsoft Outlook 2010 Inside Out", Aug. 15, 2010, Microsoft Press, XP055191255, ISBN: 978-0-73-564560-8 *Connecting to a Contact's Website; p. 9 *figures 18-2.

* cited by examiner

METHODS AND DEVICES FOR FACILITATING ACCESS TO A WEBPAGE ASSOCIATED WITH A CONTACT

TECHNICAL FIELD

The present application relates to contact information management and more particularly to methods and electronic devices for facilitating access to a webpage associated with a contact.

BACKGROUND

Electronic and software-based systems may be designed to store contact information. For example, a contact manger application may allow a user to populate a contact entry with contact information such as a first name, last name, business name, title, address, email address, etc. Contact information may also include one or more webpage identifiers, such as Uniform Resource Locators ("URL") associated with a contact. Such webpage identifiers may identify the location of one or more webpages associated with the contact. For example, the webpage identifiers may identify a personal webpage, such as a blog operated by the user.

A contact manager application may not provide a user with an easy way of accessing webpages associated with a contact. A user desiring to access a webpage associated with a contact may have to locate and open the contact manager application, navigate to a desired contact entry, retrieve the webpage identifier, and paste it into a web browser in order to access the webpage. This can be a cumbersome process for a user.

BRIEF DESCRIPTION OF THE DRAWINGS

Reference will now be made, by way of example, to the accompanying drawings which show example embodiments of the present application, and in which.

Like reference numerals are used in the drawings to denote like elements and features.

DETAILED DESCRIPTION

In one aspect, the present application describes a method performed by an electronic device. The method includes: obtaining a first contact entry; determining if the first contact entry includes a webpage identifier; and if the first contact entry includes a webpage identifier, populating a portion of a web browser with the webpage identifier included in the first contact entry.

In another aspect, the present application describes an electronic device. The electronic device includes a memory and a processor coupled with the memory. The processor is configured for obtaining a first contact entry; determining if the first contact entry includes a webpage identifier; and if the first contact entry includes a webpage identifier, populating a portion of a web browser with the webpage identifier included in the first contact entry.

In a further aspect, the present application describes a method of providing access to one or more webpages associated with one or more contacts. The method includes: displaying a list of contacts; receiving a selection of one of the contacts; and opening a webpage associated with the contact.

Other example embodiments of the present application will be apparent to those of ordinary skill in the art from a review of the following detailed description in conjunction with the drawings.

Example embodiments of the present application are not limited to any particular operating system, electronic device architecture, server architecture or computer programming language.

System Overview

Figure 1:
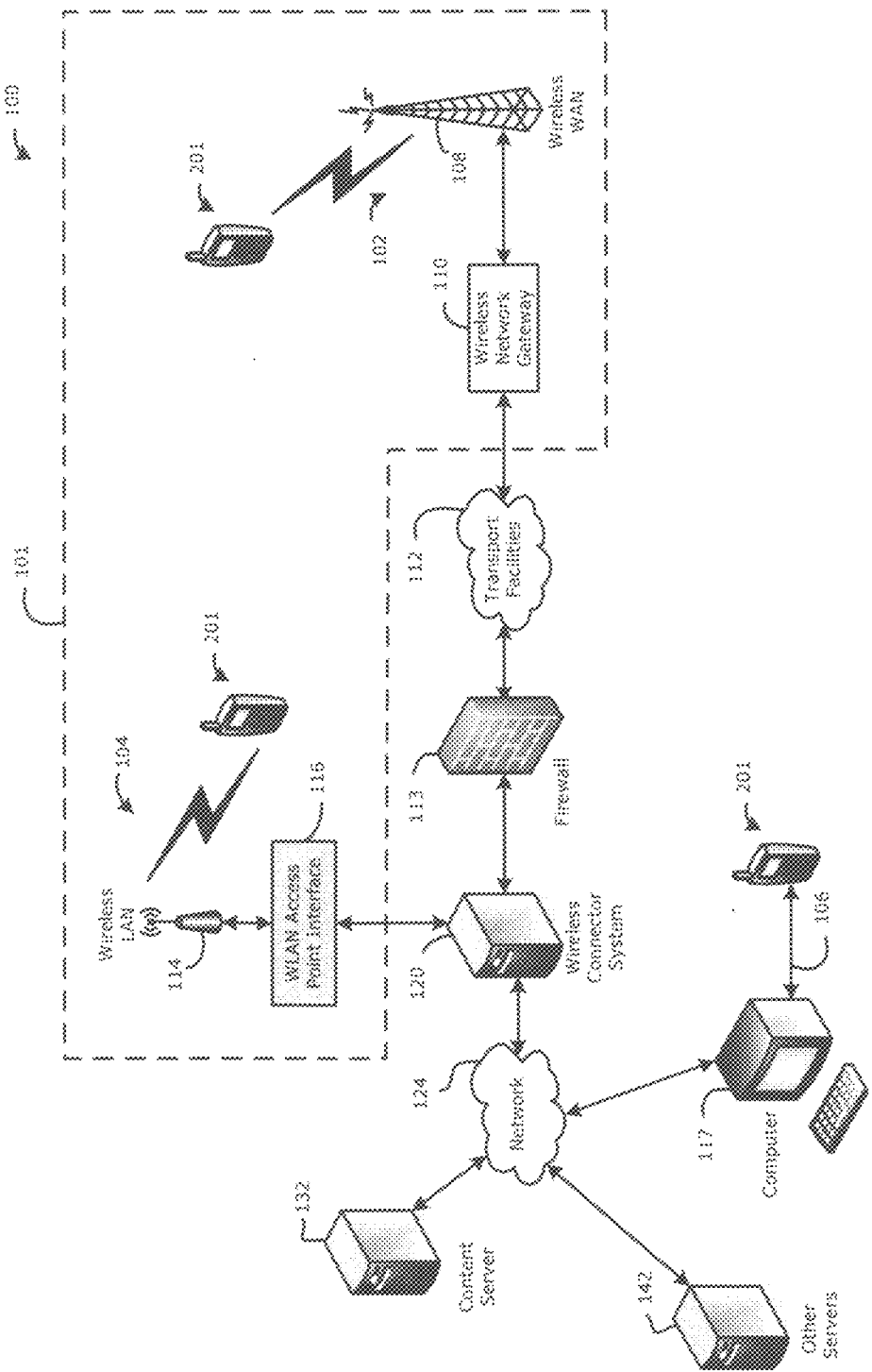
FIG. 1 is a block diagram illustrating an operating environment in accordance with example embodiments of the present disclosure.

Reference is first made to FIG. 1 which shows in block diagram form a communication system 100 in which example embodiments of the present application can be applied. The communication system 100 includes a number of electronic devices 201 which may be connected to the remainder of the system 100 in any of several different ways. In the example embodiment illustrated, the electronic devices 201 are mobile communication devices. That is, the electronic devices 201 are configured to communicate with other electronic devices, servers and/or systems (i.e. they are "communication" devices) and the electronic devices 201 are portable and may be easily moved between different physical locations (i.e. they are "mobile" devices). However, in other example embodiments, the electronic devices 201 may not be portable (i.e. may not be "mobile" devices) and/or may not be configured to communication with other electronic devices, servers or systems (i.e. may not be "communication" devices).

Accordingly, several instances of electronic devices 201 are depicted in FIG. 1 employing different example ways of connecting to the system 100. The electronic devices 201 are connected to a communication network such as a wireless network 101 which may include one or more of a Wireless Wide Area Network (WWAN) 102 and a Wireless Local Area Network (WLAN) 104 or other suitable network arrangements. In some example embodiments, the electronic devices 201 are configured to communicate over both the WWAN 102 and WLAN 104, and to roam between these networks. In some example embodiments, the wireless network 101 may include multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 may be operated by a mobile network service provider that provides subscription packages to users of the electronic devices 201. In some example embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further include a wireless network gateway 110 which connects the electronic devices 201 to transport facilities 112, and through the transport facilities 112 to a wireless connector system 120. Transport facilities 112 may include one or more private networks or lines, the public internet, a virtual private network, or any other suitable network. The wireless connector system 120 may be operated, for example, by an organisation or enterprise such as a corporation, university, or governmental department, which allows access to a network 124 such as an internal or enterprise network and its resources, or the wireless connector system 120 may be operated by a mobile network provider. In some example embodiments, the network 124 may be realised using the internet rather than an internal or enterprise network.

The wireless network gateway 110 provides an interface between the wireless connector system 120 and the WWAN 102, which facilitates communication between the electronic devices 201 and other devices (not shown) connected, directly or indirectly, to the WWAN 102. Accordingly, communications sent via the electronic devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the electronic devices 201.

The WLAN 104 includes a wireless network which, in some example embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other example embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 114 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed electronic devices 201. The wireless connector system 120 also provides administrative control and management capabilities over users and electronic devices 201 which may connect to the wireless connector system 120.

The wireless connector system 120 allows the electronic devices 201 to access the network 124 and connected resources and services such as a content server 132 (for providing content such as internet content or content from an organization's internal servers to the electronic devices 201 in the wireless network 101) and optionally other servers 142. The other servers 142 may include a messaging server (for example, a Microsoft Exchange™, IBM Lotus Domino™, or Novell GroupWise™ email messaging server) and an application server for implementing server-based applications such as instant messaging (IM) applications.

The wireless connector system 120 typically provides a secure exchange of data (e.g. email messages, contact data, personal information manager (PIM) data, and IM data) with the electronic devices 201. In some example embodiments, communications between the wireless connector system 120 and the electronic devices 201 are encrypted. In some example embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

The wireless network gateway 110 is adapted to send data packets received from the electronic device 201 over the WWAN 102 to the wireless connector system 120. The wireless connector system 120 then sends the data packets to the appropriate connection point such as the content server 132, or other servers 142. Conversely, the wireless connector system 120 sends data packets received, for example, from the content server 132 or other servers 142 to the wireless network gateway 110 which then transmit the data packets to the destination electronic device 201. The AP interfaces 116 of the WLAN 104 provide similar sending functions between the electronic device 201, the wireless connector system 120 and network connection point such as the content server 132 or other servers 142.

The network 124 may include a private local area network, metropolitan area network, wide area network, the public internet or combinations thereof and may include virtual networks constructed using any of these, alone, or in combination.

An electronic device 201 may alternatively connect to the wireless connector system 120 using a computer 117, such as desktop or notebook computer, via the network 124. A link 106 may be provided for exchanging information between the electronic device 201 and computer 117 connected to the wireless connector system 120. The link 106 may include one or both of a physical interface and short-range wireless communication interface. The physical interface may include one or combinations of an Ethernet connection, Universal Serial Bus (USB) connection, Firewire™ (also known as an IEEE 1394 interface) connection, or other serial data connection, via respective ports or interfaces of the mobile electronic device 201 and computer 117. The short-range wireless communication interface may be a personal area network (PAN) interface. A personal area network is a wireless point-to-point connection meaning no physical cables are required to connect the two end points. The short-range wireless communication interface may include one or a combination of an infrared (IR) connection such as an Infrared Data Association (IrDA) connection, a short-range radio frequency (RF) connection such as one specified by IEEE 802.15.1 or the Bluetooth™ special interest group, or IEEE 802.15.3a, also referred to as UltraWideband (UWB), or other PAN connection.

It will be appreciated that the above-described communication system is provided for the purpose of illustration only, and that the above-described communication system includes one possible communication network configuration of a multitude of possible configurations for use with the electronic devices 201. The teachings of the present application may be employed in connection with any other type of network and associated devices that are effective in implementing or facilitating wireless communication. Suitable variations of the communication system will be understood to a person of skill in the art and are intended to fall within the scope of the present application.

Accordingly, an electronic device 201 may have Internet access. That is, in at least some example embodiments, the electronic device 201 may be configured to connect to the Internet through a communication system, such as the communication system 100 of FIG. 1. In at least some example embodiments, the communication system 100 may allow the electronic device 201 to access one or more content servers 132 which are publicly or privately accessible through the Internet. Such content servers 132 may be referred to as web servers. Web servers are servers which are configured to deliver content, such as web pages on request from electronic devices 201 connected to the Internet. In at least some example embodiments, a web server may be configured to deliver HyperText Markup Language (HTML) documents to electronic devices 201. In at least some example embodiments, one or more of the web servers may be configured to deliver content to an electronic device 201 in response to receiving a Hypertext Transfer (or Transport) Protocol (HTTP) request from a web browser operating on that electronic device 201.

A web server may have one or more addresses associated with that web server. An address may, for example, be in the form of a Uniform Resource Locator (URL). The web server may be configured to map a path component of an address, such as a URL, to a local file system if the request received from an electronic device 201 is a static request or to a program name if the request received from the electronic device 201 is a dynamic request. The address may be referred to as a webpage identifier since it may be used to identify the location of a webpage.

Example Electronic Device

Figure 2:
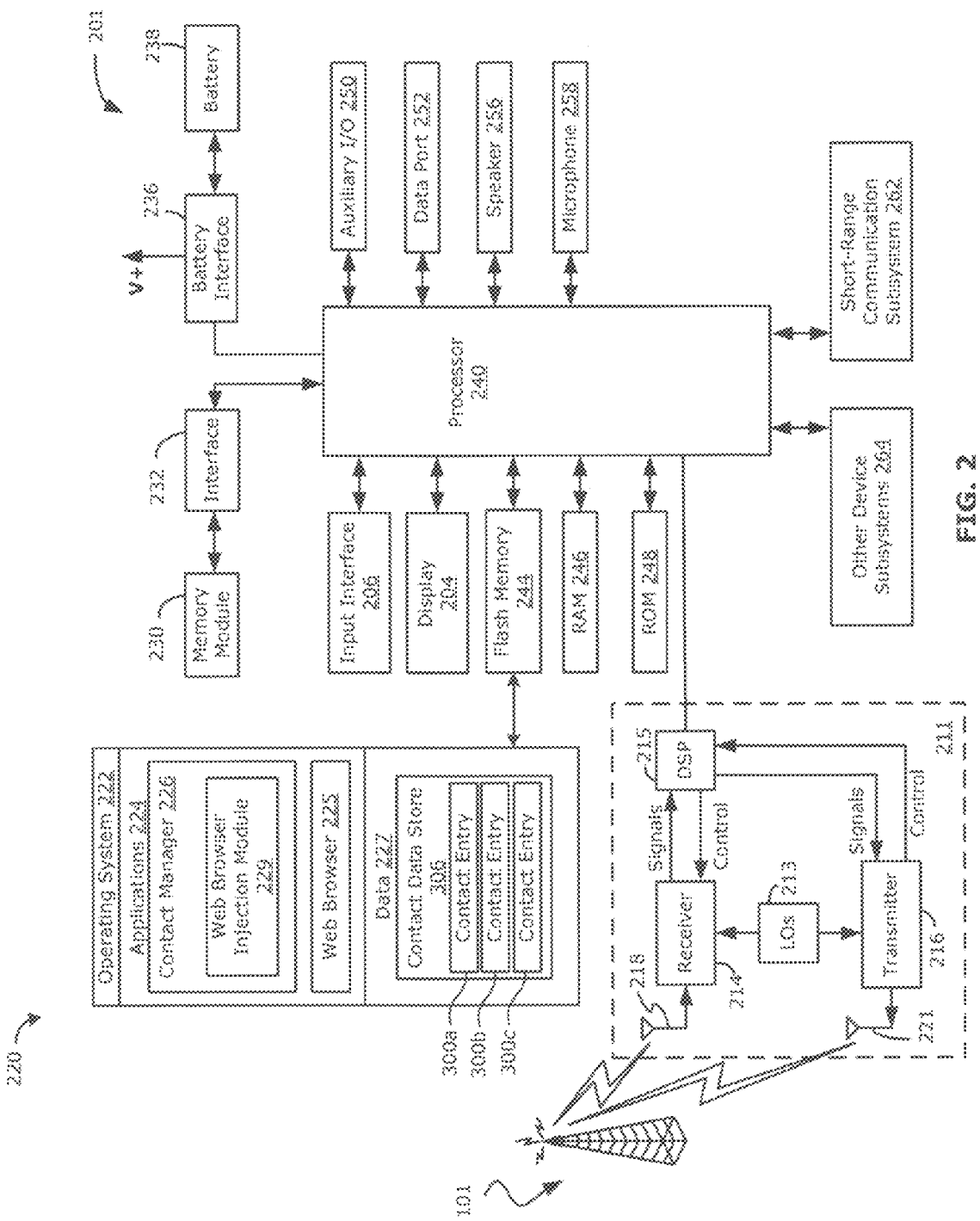
FIG. 2 is a block diagram illustrating an electronic device in accordance with example embodiments of the present disclosure.

Reference is now made to FIG. 2 which illustrates an example electronic device 201 in which example embodiments described in the present application can be applied. In the illustrated example embodiment, the electronic device 201 is a communication device, such as a mobile communication device. In at least some example embodiments, the electronic device 201 is a two-way communication device having data and voice communication capabilities, and the capability to communicate with other computer systems, for example, via the Internet. Depending on the functionality provided by the electronic device 201, in various example embodiments the electronic device 201 may be a multiple-mode communication device configured for data and voice communication, a mobile telephone a wearable computer such as a watch, a PDA (personal digital assistant, or a computer system.

In at least some example embodiments, the electronic device 201 may be a smartphone. A smartphone is a mobile phone which offers more advanced computing capability than a basic non-smartphone cellular phone. For example, a smartphone may have the ability to run third party applications which are stored on the smartphone.

Similarly, in at least some example embodiments, the electronic device 201 may be a tablet computer. A tablet computer (which may also be referred to as a tablet) is an electronic device 201 which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket while tablet computers are larger and may not fit within pant pockets. For example, many tablet computers have a height with is seven inches (7") or more. In some example embodiments, the tablet computer may be a slate computer. A slate computer is a tablet computer which does not include a dedicated keyboard. A slate computer may allow for text input through the use of a virtual keyboard or an external keyboard which connects to the slate computer via a wired or wireless connection.

The electronic device 201 includes a housing (not shown), housing the components of the electronic device 201. The internal components of the electronic device 201 are constructed on a printed circuit board (PCB). The electronic device 201 includes a controller comprising at least one processor 240 (such as a microprocessor) which controls the overall operation of the electronic device 201. The processor 240 interacts with device subsystems such as a wireless communication subsystem 211 for exchanging radio frequency signals with the wireless network 101 to perform communication functions. The processor 240 interacts with additional device subsystems including a display 204 such as a liquid crystal display (LCD), input interfaces 206 (such as a keyboard, one or more control buttons, and/or a touch-sensitive overlay associated with a touchscreen display) flash memory 244, random access memory (RAM) 246, read only memory (ROM) 248, auxiliary input/output (I/O) subsystems 250, a data port 252 (which may be a serial data port, such as a Universal Serial Bus (USB) data port), one or more speakers 256, one or more microphones 258, a short-range communication subsystem 262, and other device subsystems generally designated as 264. Some of the subsystems shown in FIG. 2 perform communication-related functions, whereas other subsystems may provide "resident" or on-device functions.

The electronic device 201 may include a touchscreen display in some example embodiments. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 201 and a single antenna may be shared by both receiver and transmitter, as is known in the art. The particular design of the wireless communication subsystem 211 depends on the wireless network 101 in which electronic device 201 is intended to operate.

The electronic device 201 may communicate with any one of a plurality of fixed transceiver base stations 108 (FIG. 1) of the wireless network 101 within its geographic coverage area. The electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 218. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may comprise an external communication link or interface, for example, an Ethernet connection. The electronic device 201 may comprise other wireless communication interfaces for communicating with other types of wireless networks, for example, a wireless network such as an orthogonal frequency division multiplexed (OFDM) network. The auxiliary I/O subsystems 250 may include a pointing or navigational tool (input device) such as a clickable trackball or scroll wheel or thumbwheel, or a vibrator for providing vibratory notifications in response to various events on the electronic device 201 such as receipt of an electronic message or incoming phone call, or for other purposes such as haptic feedback (touch feedback).

In some example embodiments, the electronic device 201 also includes a removable memory module 230 (typically comprising flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network type. The memory module 230 may be inserted in or connected to the memory module interface 232 of the electronic device 201.

The electronic device 201 stores data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the device memory.

The data port 252 may be used for synchronization with a user's host computer 117 (FIG. 1). The data port 252 enables a user to set preferences through an external device or software application and extends the capabilities of the electronic device 201 by providing for information or software downloads to the electronic device 201 other than through the wireless network 101. The alternate download path may, for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer 117 (FIG. 1) using standard connectivity protocols. When a user connects their electronic device 201 to the host computer 117 (FIG. 1) via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer 117 (FIG. 1) for processing.

The electronic device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the electronic device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the electronic device 201 during or after manufacture. Additional applications and/or upgrades to the electronic device's operating system 222 or software applications 224 may also be loaded onto the electronic device 201 through the wireless network 101, the auxiliary I/O subsystem 250, the data port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the electronic device 201 and may provide enhanced on-device functions, communication-related functions, or both. For example, secure communication applications may enable electronic commerce functions and other such financial transactions to be performed using the electronic device 201.

In some example embodiments, the electronic device 201 may provide two principal modes of communication: a data communication mode and a voice communication mode. In the data communication mode, a received data signal such as a text message, an email message, or web page download will be processed by the communication subsystem 211 and input to the processor 240 for further processing. For example, a downloaded web page may be further processed by a browser application or an email message may be processed by the email messaging application and output to the display 204. A user of the electronic device 201 may also compose data items, such as email messages, for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output is typically accomplished primarily through the speaker 256, the display 204 may also be used to provide an indication of the identity of a calling party, duration of a voice call, or other voice call related information.

The processor 240 operates under stored program control and executes software modules 220 stored in memory such as persistent memory, for example, in the flash memory 244. As illustrated in FIG. 2, the software modules 220 include operating system software 222, and software applications 224 including a contact manager 226 and a web browser 225. In the example embodiment of FIG. 2, the contact manager 226 and the web browser 225 are implemented as separate stand-alone applications 224, but in other example embodiments, one or both of these applications could be implemented as part of the operating system 222 or another application 224.

The electronic device 201 may include a range of additional software applications 224, including, for example, a notepad application, voice communication (i.e. telephony) application, mapping application, or a media player application, or any combination thereof. Each of the software applications 224 may include layout information defining the placement of particular fields and graphic elements (e.g. text fields, input fields, icons, etc.) in the user interface (i.e. the display 204) according to the application.

Those skilled in the art will appreciate that the software modules 220 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The web browser 225 is capable of accessing and displaying a webpage. The web browser 225 may use a webpage identifier 361 (FIG. 3) such as a URL to establish a hypertext transfer protocol (HTTP) or hypertext transfer protocol secure (HTTPS) connection to a webpage at an address corresponding to a webpage identifier over the internet. The web browser 225 may be equipped with a scripting engine to run client-side scripts such as a JavaScript engine for accessing HTML (Hypertext Markup Language) webpages that include JavaScript code. As will be appreciated by persons skilled in the art, JavaScript is a scripting language used in client-side web document, for example, in web pages. The JavaScript engine of the web browser 225 (also known as JavaScript interpreter or JavaScript implementation) is an interpreter that interprets JavaScript scripts embedded in or included from HTML pages and executes the scripts accordingly. Other scripting languages may be used such as, for example, Visual Basic for Applications (VBA), VBScript, and Visual Basic .NET all from Microsoft Corporation. The web browser also includes multiple and various graphical user interfaces (GUIs) to provide a user with an interface to interact with the web browser 225. A GUI is a type of user interface that allows the user to interact with a device and/or an application utilizing images rather than text commands. The GUI represents information and actions available to the user through graphical icons and visual indicators. The GUI can be implemented by various programming languages including JavaScript, .NET, C++, etc.

The web browser 225 may be Internet Explorer™ by Microsoft Corporation, FireFox™ by Mozilla Corporation, or any other web browser having the necessary capabilities for implementing the functions described herein. In some example embodiments, the web browser 225 is provided by the designer or manufacturer of the electronic device 201. The web browser 225 may also be referred to as an Internet browser in at least some example embodiments.

A contact manager 226 performs the functions of an address book and allows contact entries 300a, 300b, 300c to be created and stored in memory. For example, the contact manager 226 may permit contact entries 300a, 300b, 300c to be stored in a contact data store 306 in the data area 227 of memory.

Contact entries 300a, 300b, 300c are records which store contact information for a contact. At least some of the contact entries 300a, 300b, 300c may include a webpage identifier field 360 (FIG. 3) for storing a webpage identifier 361 (FIG. 3) associated with a contact. The webpage identifier field 360 (FIG. 3) may be populated with a webpage identifier 361 (FIG. 3) which is an address which may be used for locating a webpage. That is, the webpage identifier is an address associated with a webpage. Contact entries 300a, 300b, 300c may also include other information such as identifying information for a contact. The identifying information may include, for example, one or more names associated with the contact. An example contact entry 300 will be discussed in greater detail below with reference to FIG. 3.

The contact manager 226 is configured to receive new contact entries from one or more input interfaces 206 associated with the electronic device 201. For example, a user of the electronic device 201 may interact with an input interface 206 such as a navigational input device in order to input an instruction to the contact manager 226 to create a new contact entry 300a, 300b, 300c. Similarly, in at least some example embodiments, the contact manager 226 is configured to receive contact entries via the communication subsystem 211. For example, in some example embodiments, a contact entry 300a, 300b, 300c may be received in an electronic message, such as an email. The contact manager 226 may store contact entries received via an input interface 206 or a communication subsystem 211 in the contact data store 306. Such storage may occur automatically or at the request of the user (e.g. by selecting an option to store a contact entry to memory such as a "save" option).

In at least some example embodiments, after contact entries 300a, 300b, 300c are created they may be accessed by the contact manager 226. In at least some example embodiments, contact entries 300a, 300b, 300c may be accessed by other applications 224. For example, in at least some example embodiments, contact entries 300a, 300b, 300c may be accessed by the web browser 225. In some example embodiments, other applications may access the contact entries 300a, 300b, 300c directly. In other example embodiments, the contact manager 226 may control access to the contact entries 300a, 300b, 300c. In at least some such example embodiments, other applications may access the contact entries 300a, 300b, 300c by requesting access from the contact manager 226. For example, in at least some example embodiments, the contact manager 226 may be equipped with an application programming interface (API) which allows other applications to request information associated with contact entries 300a, 300b, 300c. In response to receiving such requests via an API, the contact manager 226 may retrieve the requested information and provide the information to the requesting application.

In the example illustrated, three contact entries are shown including a first contact entry 300a, a second contact entry 300b, and a third contact entry 300c. However, the contact data store 306 may store more or less contact entries 300a, 300b, 300c than are shown in FIG. 2.

The contact entries may be received and/or stored in vCard format or in another format which describes contact information.

In at least some example embodiments, the electronic device 201 includes one or more software modules 220 which are configured to facilitate access to webpages associated with contacts. In at least some example embodiments, these software modules 220 may be configured to determine if a contact entry includes a webpage identifier, such as a URL, and, if so, to populate a portion of a web browser with the webpage identifier included in the first contact entry. A software module 220 which is configured to facilitate access to webpages associated with contacts may be referred to as a web browser injection module 229. Specific functions and features of the web browser injection module 229 will be discussed in greater detail below with reference to FIGS. 4 to 8.

In the example embodiment illustrated in FIG. 2, the web browser injection module 229 is provided by the contact manager 226. However, in other example embodiments, the web browser injection module 229 or a portion thereof may be provided by another application. For example, in at least some example embodiments, the web browser injection module 229 or a portion therefor may be provided by the web browser 229. Similarly, in at least some example embodiments the web browser injection module 229 or a portion thereof may be provided by the operating system 222. Furthermore, while the web browser injection module 229 is illustrated as a single block, the web browser injection module 229 may be comprised of a plurality of software modules.

Example Contact Entry

Figure 3:
FIG. 3 is a block diagram illustrating a contact entry in accordance with example embodiments of the present disclosure.

Reference is now made to FIG. 3 which shows an example embodiment of a contact entry 300. The contact entry 300 may include contact information associated with a contact. A contact is an entity such as a person or business which is associated with a user of the electronic device 201.

The contact entry 300 includes a plurality of fields 305, including, for example, one or more name field 310 (which may store a personal name 311 of a contact, such as a first name, middle name, last name, and/or nickname), one or more phone number fields 320 (which may store one or more phone numbers 321 associated with a contact, such as a home phone number, a business phone number, a mobile phone number, etc.), a company name field 330 (which may store a company name 331 associated with a contact, such as the name of the contact's employer), a mailing address field 340 (which may store a residential or business address 341 associated with the contact) and an electronic messaging address field 350 (which may be used to store an electronic messaging address for the contact, such as an email address 351). The contact entry may also include a webpage identifier field 360 for storing a webpage identifier 361. The contact entry 300 may also include other fields for storing other contact information not specifically listed above.

The webpage identifier 361 includes information which describes the location of a webpage associated with the contact. For example, the webpage identifier 361 may be an address associated with a webpage. In at least some example embodiments, the webpage identifier 361 may include a Uniform Resource Locator (URL) for a webpage associated with the contact entry 300. The URL is a character string that specifies the location of a resource, such as a webpage, and the mechanism to retrieve the resource over the internet. The URL may contain the name of the protocol to be used to access the resource, a domain name that identifies a specific network and/or server where the resource is located and a path name that specifies the location of the resource within the network and/or server.

A webpage identifier 361 may identify a work webpage (i.e. a business webpage) or a personal webpage. For example, a contact entry 300 for a company may include a webpage identifier 361 identifying the company homepage. The webpages associated with a contact entry may be stored in the network 124 (FIG. 1), servers connected to the network 124 (for example, the content server 132 (FIG. 1) or other servers 142 (FIG. 1)) or on remote servers. That is, the webpage identifier 361 in a contact entry 300 may be associated with a web server. The web server may host a webpage which is located at the location defined by the webpage identifier 361.

Populating a Web Browser

Figure 4:
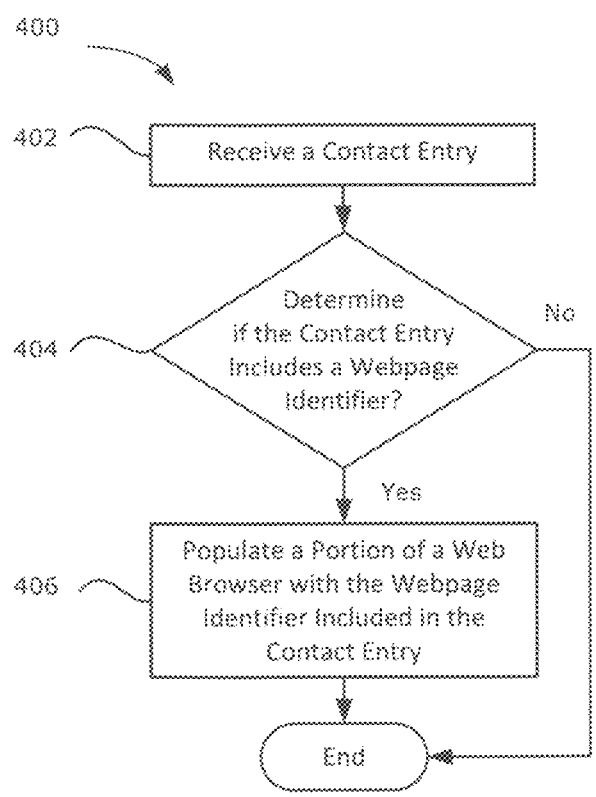
FIG. 4 is a flowchart illustrating an example method of facilitating access to a webpage associated with a contact in accordance with example embodiments of the present disclosure.

Referring now to FIG. 4, a method 400 of populating a portion of a web browser with a contact webpage identifier will be discussed. The electronic device 201 may be configured to perform the method 400 of FIG. 4. In at least some example embodiments, the processor 240 of the electronic device 201 is configured to perform the method 400 of FIG. 4. One or more applications 224 on the electronic device 201 may contain computer readable instructions which cause the processor 240 of the electronic device 201 to perform the method 400 of FIG. 4. In at least some example embodiments, any one or more of the contact manager 226, the webpage browser 225 and/or the web browser injection module 229 stored in memory of the electronic device 201 are configured to perform the method of FIG. 4. More particularly, the contact manager 226, the webpage browser 225 and/or the web browser injection module 229 may include computer readable instructions which, when executed, cause the processor 240 to perform the method of FIG. 4. It will be appreciated that the method of FIG. 4 may, in at least some example embodiments, be provided by other software applications or modules apart from those specifically discussed above; for example the operating system 222. Accordingly, any features which are referred to as being performed by the electronic device 201 may be performed by any one or more of the software applications or modules referred to above or other software modules.

In at least some example embodiments, at least some of the method of FIG. 4 may be performed by or may rely on other applications 224 or modules which interface with the contact manager 226, the webpage browser 225 and/or the web browser injection module 229. For example, the contact manager 226 and/or the web browser 225 may be equipped with an application programming interface (API) which allows other software or modules to access features of these applications 224.

Referring to FIG. 4, a flowchart of an example embodiment of a method 400 for facilitating access to a webpage associated with a contact is illustrated. At 402 a contact entry 300 (FIG. 3) is received at the electronic device 201.

In some example embodiments, at 402, the electronic device 201 may receive the contact entry 300 from memory. For example, in at least some example embodiments, the electronic device 201 may retrieve the contact entry from the contact data store 306. That is, the contact entry 300 which is obtained at 402 may be a contact entry which was previously stored in memory of the electronic device 201.

In other example embodiments, the contact entry 300 may be obtained at 402 from an input interface 206 associated with the electronic device 201. For example, the contact entry 300 may be input to the electronic device 201 using a touchscreen or a physical keyboard associated with the electronic device 201. That is, in at least some example embodiments, obtaining the contact entry 300 at 402 includes receiving a request at the electronic device 201 to create a contact entry 300. The request may be received, for example, from an input interface 206 associated with the electronic device 201. For example, the request may be received from a navigational input device, such as a trackball, track pad or touchscreen, which may be used to interact with a GUI on the display 204 to input a request to the electronic device 201 to create a contact entry 300. In response to receiving such a request, the contact manager 226 may create a contact entry 300. That is, the contact manager 226 may store the contact entry 300 containing received data in memory of the electronic device 201.

In further example embodiments, the contact entry 300 may be obtained, at 402, according to another method. For example, in at least some example embodiments, the contact entry 300 may be received at 402 at the electronic device 201 via the communication subsystem 211 associated with the electronic device 201. For example, in at least some example embodiments, the contact entry 300 may be an attachment to an electronic message received at 402 at the electronic device 201. The attachment may, for example, be a vCard. A vCard is a file format standard for electronic business cards. A received contact entry 300 may be in other forms not specifically discussed herein.

In response to obtaining a contact entry 300, the electronic device 201, at 404, determines if the contact entry 300 includes a webpage identifier 361 (FIG. 3). In order to determine if the contact entry 300 includes a webpage identifier 361, in some example embodiments, the electronic device 201 searches the contact entry 300, and identifies whether there is a webpage identifier 361 included in the contact entry 300. In some example embodiments, the electronic device 201 parses the contact entry 300 by searching the contact entry 300 for a webpage identifier 361 (such as a URL) and if found, extracts the webpage identifier 361 associated with the contact entry.

Parsing is a process of analyzing a set of data elements for structure in relation to a set of structural rules and producing a set of smaller data elements based on the structural rules. The data elements are matched with appropriate structural rules to break down the data elements. In the example embodiment, the parsing process may be carried out by the electronic device 201. In at least some example embodiments, a plurality of fields 305 (FIG. 3) in the contact entry 300 are parsed for a webpage identifier 361.

In at least some example embodiments, the contact entry 300 may have one or more specific webpage identifier fields 360 in which one or more webpage identifiers 361 may be stored. In at least some example embodiments, at 404, the electronic device 201 examines the contact entry 300 to determine whether the webpage identifier field 360 is populated with a webpage identifier 361. If the webpage identifier field 360 is populated with a webpage identifier 361, then that the electronic device 201 may determine that the contact entry 300 includes a webpage identifier 361. If, however, no webpage identifier 361 is included in the webpage identifier field 360, then the electronic device 201 may determine that the contact entry 300 does not include a webpage identifier 361.

Accordingly, if, after searching, no webpage identifier 361 is found in the contact entry 300, then the method 400 may end. If, however, a webpage identifier 361 is included in the contact entry 300, then at 406 the electronic device 201 populates a portion of a web browser 225 with the webpage identifier 361 included in the contact entry 300.

In at least some example embodiments, at 406, the electronic device 201 includes the webpage identifier 361 is included in the web browser 225 so that the webpage associated with the webpage identifier 361 may be easily accessed. That is, at 406, the web browser 225 may be configured with the identified webpage identifier 361 so that a user may later access the webpage associated with the webpage identifier 361 directly through the web browser without having to manually type the webpage identifier 361 into an address bar and without having to open the contact manager 226.

In some example embodiments, populating a portion of a web browser 225 with the webpage identifier 361 includes providing a link to a webpage associated with the webpage identifier 361 in the web browser 225. Such a link may be referred to as a contact webpage link 614 and will be discussed in greater detail below with reference to FIG. 6.

In some example embodiments, at 406, the electronic device may configure a graphical user interface to include a link to a webpage associated with the webpage identifier. An example graphical user interface which is configured to include such a link will be discussed below with reference to FIG. 6.

In at least some example embodiments, at 406, the electronic device 201 may extract the webpage identifier from the contact entry and may store it in a memory store associated with the web browser. The memory store is an area or folder in memory of the electronic device 201 which may be used for storing links for the web browser 225 (FIG. 2). For example, the memory store may be a folder where links are stored.

Figure 6:
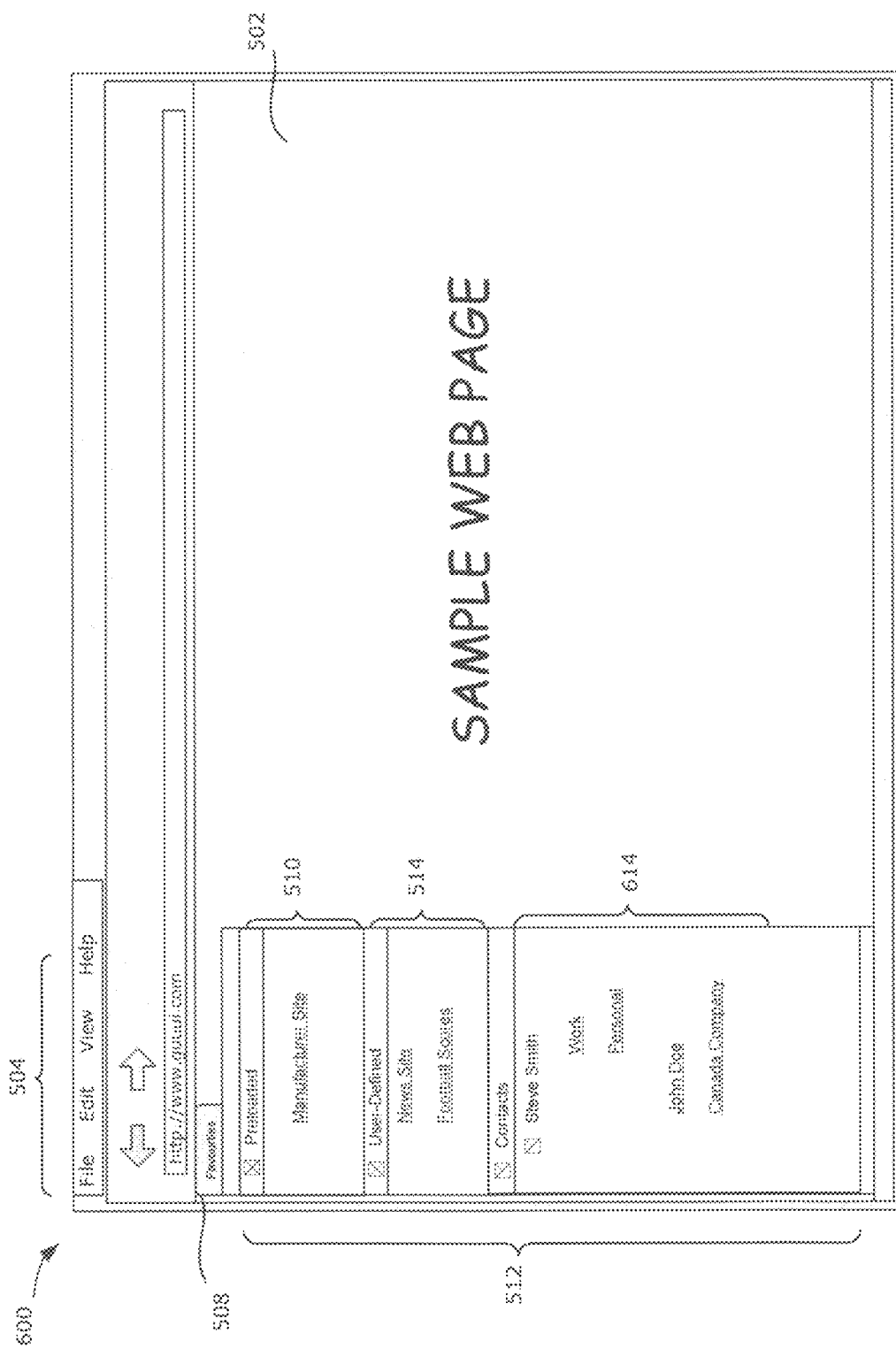
FIG. 6 is an example web browser screen in accordance with example embodiments of the present disclosure.

In at least some example embodiments, at 406, the electronic device 201 may populate a portion of the web browser 225 with a name included in the contact entry 300. The name may, for example, be a personal name 311 (FIG. 3) of a contact (i.e. a name of an individual) or a company name 331 of a contact. Accordingly, in at least some example embodiments, at 406, the electronic device 201 may locate a name in the contact entry 300 and may use that name when creating the contact webpage link 614 (FIG. 6). That is, the electronic device 201 may use a name and a webpage identifier which are both included in the same contact entry 300 in order to create the contact webpage link 614. In at least some such example embodiments, the electronic device 201 may configure the web browser 225 to display the name as a selectable link within a web browser screen 600 (FIG. 6). A graphical user interface associated with the web browser 225 may be configured to identify a link to a webpage associated with a webpage identifier using a name associated with the contact entry which included that webpage identifier. That is, the web browser may be configured to display the name associated with the contact entry and to associate that name with the webpage identifier which is associated with the same contact entry so that selection of the name causes the web browser to open a webpage located at a location specified by the webpage identifier associated with that name.

In at least some example embodiments, the electronic device 201 may be configured to prefer a personal name 311 over a company name 331. That is, in at least some example embodiments, the electronic device 201 is configured to determine if the contact entry 300 includes a personal name 311. If the contact entry includes a personal name, then the electronic device 201 may create a link based on that personal name (i.e. the personal name may be used as a display name which is displayed when a link is displayed in a web browser screen 600 (FIG. 6)). If, however, the contact entry 300 does not include a personal name, then the electronic device 201 may determine whether the contact entry 300 includes a company name 331. If the contact entry includes a company name, then the electronic device 201 may create a link based on that company name (i.e. the company name may be used as a display name which is displayed when a link is displayed in a web browser screen 600 (FIG. 6)).

In other example embodiments, the electronic device 201 may be configured to prefer a company name 331 over a personal name 311. That is, in at least some example embodiments, the electronic device 201 is configured to determine if the contact entry 300 includes a company name 311. If the contact entry includes a company name, then the electronic device 201 may create a link based on that company name (i.e. the company name may be used as a display name which is displayed when a link is displayed in a web browser screen 600 (FIG. 6)). If, however, the contact entry 300 does not include a company name, then the electronic device 201 may determine whether the contact entry 300 includes a personal name 331. If the contact entry includes a personal name, then the electronic device 201 may create a link based on that personal name (i.e. the personal name may be used as a display name which is displayed when a link is displayed in a web browser screen 600 (FIG. 6)).

In the example embodiment of FIG. 4, a single contact entry 300 is used in order to create one or more links to a webpage based on a webpage identifier included in that contact entry 300. In other example embodiments, links may be created based on more than one contact entry. For example, in at least some example embodiments, the method 400 may be performed for a first contact entry 300a (FIG. 2), and then performed for a second contact entry 300b (FIG. 2). That is, after the method 400 is performed for one contact entry (which may be referred to as a first contact entry), a second contact entry may be obtained, and the electronic device 201 may then determine if the second contact entry includes a second webpage identifier. If the second contact entry includes a second webpage identifier, then the electronic device 201 may populate a portion of the web browser with the second webpage identifier included in the second contact entry in manner described above with reference to 406.

Furthermore, in at least some example embodiments, contact entries 300 may be permitted to include more than one webpage identifier. For example, in some example embodiments, a contact entry may include a first webpage identifier, which may be associated with a personal webpage, and a second webpage identifier, which may be associated with a work webpage. In at least some such example embodiments, the electronic device 201 may determine if the contact entry includes a plurality of webpage identifiers and, if so, it may populate a portion of the web browser with the plurality of webpage identifiers. That is, it may create links based on more than one webpage identifier. For example, in at least some example embodiments, the electronic device 201 may create a first link based on a first webpage identifier which was included in a contact entry and may create a second link based on a second webpage identifier which was included in the same contact entry. In at least some example embodiments, the first link may be a link to a personal webpage and the second link may be a link to a work webpage.

Example Web Browser

Figure 5:
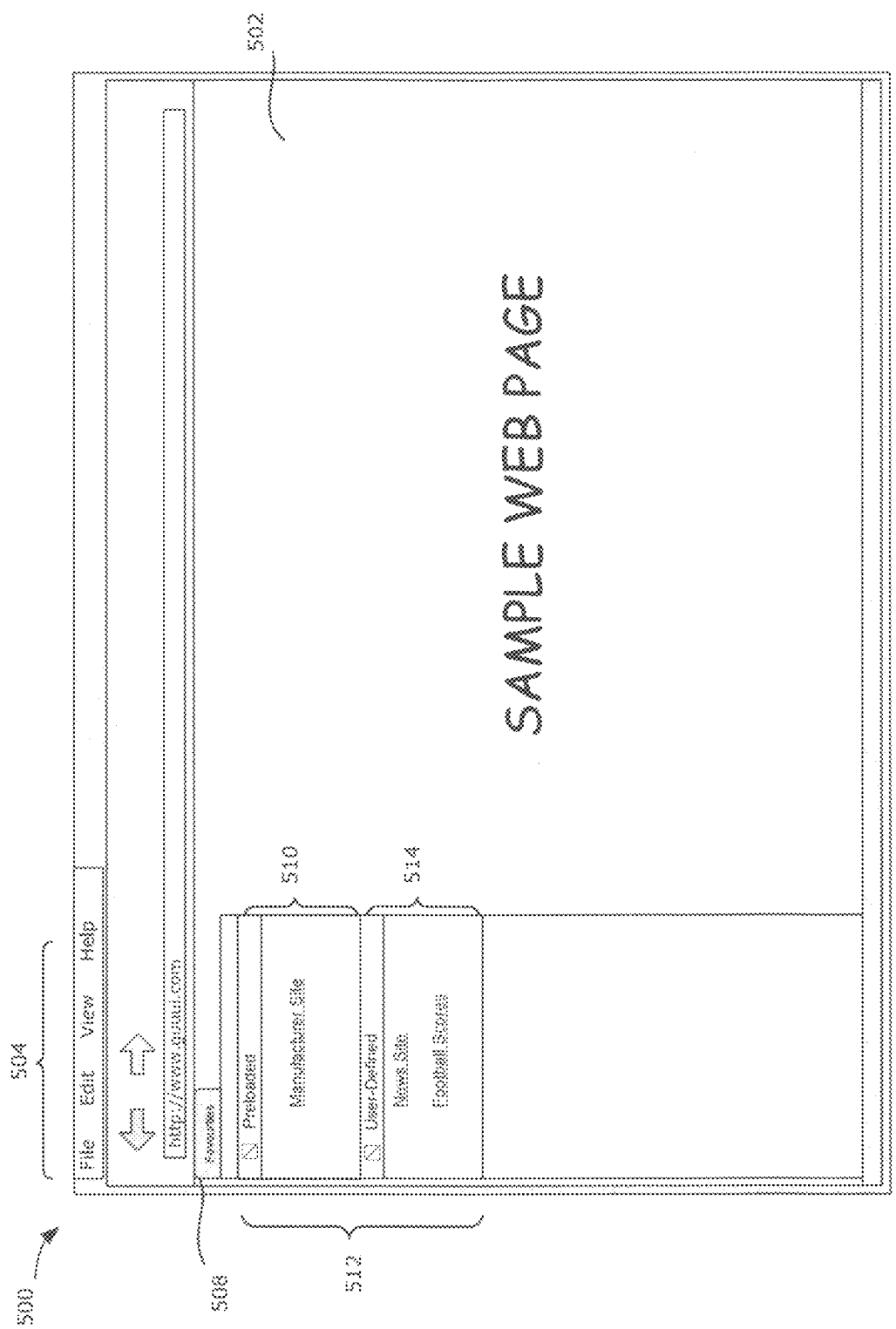
FIG. 5 is an example web browser screen in accordance with example embodiments of the present disclosure.

Reference is now made to FIG. 5, which illustrates an example web browser screen 500 provided by a web browser 225. The web browser screen 500 includes a web page display portion 502 for displaying a web page. The web browser screen 500 includes a number of selectable options 504 to manage the web browser 225. The selectable options 504 may be arranged by categories and a selection of a category displays a further list of selectable options related to the category. In at least some example embodiments, the web browser 225 provides one or more selectable options for causing the web browser 225 to display one or more persistent links 512. A persistent link 512 is a link which continues to exist in the web browser 225 even after the web browser 225 is shut down. That is, when the web browser 225 is turned back on after a period in which it was shut down or closed, the persistent links 512 which existed before the web browser 225 was shut down will be available. The persistent links 512 may, in at least some example embodiments, also be referred to as bookmarks or shortcuts.

Each persistent link 512 has a webpage identifier associated with that link. A persistent link 512 may also have a name associated that persistent link. That is, a persistent link 512 may include both a webpage identifier (i.e. an address) and a name. The name is a descriptor which may be used to describe the webpage located at the address specified by the webpage identifier.

In at least some example embodiments, the web browser 225 may be configured to display a persistent link access interface 508 in a web browser screen 500. The persistent link access interface 508 may be a graphical user interface which allows a user of the electronic device 201 to access one or more of the persistent links 512. More particularly, the persistent link access interface 508 may display the name associated with a link and may permit a user to select that name using an input interface 206 (FIG. 2) associated with the electronic device 201. The persistent link access interface 508 may also be referred to as a bookmarks area, or a favourites area.

The web browser 225 may be configured to retrieve a webpage associated with a link (i.e. a webpage located at an address specified by the webpage identifier for that link) upon or after selection of that link. That is, the web browser 225 may be configured to use the webpage identifier associated with the link to request a webpage from a web server (such as the content server 132 of FIG. 1) in response to receiving a selection of the link. In response, the web server may send the requested webpage to the electronic device 201 and the web browser 225 may receive the web page and display it in the web page display portion 502 of the web browser 225.

In at least some example embodiments, the persistent links 512 may include user-defined links 514 to one or more user-selected web pages. The user-defined links 514 include links which were created at the specific request of the user of the electronic device 201. For example, the web browser 225 may provide a selectable option for adding a persistent link to a webpage (i.e. bookmarking a webpage). For example, in at least some example embodiments, a user of an electronic device 201 may request that a persistent link 512 be added to a web page which is currently displayed in the web page display portion 502. For example, the web browser 225 may provide a "bookmark" option, "add to favourites" option, or another similar option. In response to receiving a selection of such an option, the web browser 225 may create a persistent link to the webpage. In at least some example embodiments, the web browser 225 may create a persistent link by storing the webpage identifier associated with the webpage in memory of the electronic device 201. In at least some example embodiments, a user may be permitted to define a name associated with the link. The name is displayed to a user within the persistent link access interface 508. In at least some example embodiments, the name may be populated by a user or by the electronic device 201 with a title for the webpage. For example, in at least some example embodiments, the electronic device 201 may determine the title associated with a webpage and may automatically populate the name portion of a link to that webpage with the title.

In at least some example embodiments, the persistent links 512 may include one or more preloaded links 510. The preloaded links 510 may, for example, be links which were loaded onto the electronic device 201 without specific request by the user of that electronic device 201. In at least some example embodiments, the preloaded links 510 may be links which are loaded into the persistent links 512 at the time of manufacture or provisioning of the electronic device 201. In other example embodiments, the preloaded links 510 may be links which are loaded into the persistent links 512 during installation of an application, such as the web browser 225. By way of example, the preloaded links 510 may provide a link to a webpage associated with the manufacturer of the electronic device 201, a wireless carrier providing wireless services for the electronic device 201, or a software developer.

In at least some example embodiments, the user-defined links 514 may be physically separated from the preloaded links 510. For example, the user-defined links 514 and the preloaded links 510 may be presented in separate folders.

The example web browser screen 500 of FIG. 5 includes preloaded links 510 and user-defined links 514, but does not include any contact webpage links 614 (FIG. 6). Contact webpage links 614 are links to webpages associated with contacts. Contact webpage links 614 are persistent links 512 which may be created according to the methods of any one or more of FIGS. 4 and 7. Thus, in at least some example embodiments, the web browser screen 500 is an example of a web browser screen 500 of FIG. 5 which might be displayed prior to 406 of 4 and 7 having been performed. That is, the web browser screen 500 of FIG. 5 is an example of a web browser screen 500 which might be displayed before the web browser 225 has been populated with a webpage identifier 361 included in a contact entry 300.

Example Web Browser with Contact Webpage Access

As noted above, in at least some example embodiments, a method (such as the method 400 of FIG. 4 or 700 of FIG. 7) may be performed to populate a web browser 225 with a webpage identifier 361 (i.e. 406 of FIGS. 4 and 7) included in a contact entry 300. As noted above, in at least some example embodiments, the webpage identifier 361 associated with a contact entry 300 is included in the web browser 225 so that the webpage associated with the webpage identifier 361 may be easily accessed.

Referring now to FIG. 6, an example embodiment of a web browser screen 600 which has been configured to include a link to a contact's webpage is illustrated. The web browser screen 600 may include one or more features included in the web browser screen 500 of FIG. 5. For example, in at least some example embodiments, the web browser screen 600 may include a web page display portion 502 for displaying a web page and one or more selectable options 504 to manage the web browser 225. The web browser screen 600 may also include a persistent link access interface 508 for providing one or more persistent links 512 which may include, for example, one or more user-defined links 514 and/or pre-loaded links 510.

The web browser screen 600 of FIG. 6 also includes one or more contact webpage links 614. As noted above, contact webpage links 614 are links to webpages associated with contacts. Contact webpage links 614 are persistent links 512 which may be created according to the methods of any one or more of FIGS. 4 and 7. Thus, in at least some example embodiments, the web browser screen 600 of FIG. 6 is an example of a web browser screen 600 which might be displayed after 406 of FIG. 4 or 7 having been performed. That is, the web browser screen 600 of FIG. 6 is an example of a web browser screen 600 which might be displayed after the web browser 225 has been populated with a webpage identifier 361 included in a contact entry 300.

A contact webpage link 614 is a link which was created using a webpage identifier 361 included in a contact entry 300. The contact webpage link 614 may be included in the persistent link access interface 508 portion of the web browser screen 600.

In at least some example embodiments, the contact webpage link 614 is a selectable link. The web browser 225 (FIG. 2) may be configured to navigate to a webpage associated with a contact webpage link 614 in response to selection of that link. More particularly, selection of a contact webpage link 614 may cause the web browser 225 to retrieve content from the address specified by the webpage identifier 361 associated with that link. In at least some example embodiments, selection of a contact webpage link 614 may cause an address bar associated with the web browser 225 to be automatically populated with the webpage identifier 312 for that link.

In at least some example embodiments, the contact webpage links 614 may be identified by one or more names associated with a contact. For example, in at least some example embodiments, when a contact webpage link 614 is generated (e.g. at 406 of FIG. 4), a name associated with the contact for which a webpage identifier 361 was identified may be used as a label for the contact webpage link 614 which was generated based on that identifier. The name may, for example, be a personal name 311 of a contact (e.g. in the case of "Steve Smith" or "John Doe" of FIG. 6) or may be a company name 331 (FIG. 3) (e.g. in the case of "Canada Company" of FIG. 6). In at least some example embodiments, the name may be selectable and selection of the name may cause the web browser 225 to navigate to (i.e. retrieve) an associated webpage.

In at least some example embodiments, a single contact may be associated with multiple webpages. For example, a contact may have a work webpage and a personal webpage associated with that contact. This may occur, for example, when a single contact entry includes multiple webpage identifiers. In at least some such example embodiments, the web browser 225 may be configured so that selection of a name of a contact that is associated with more than one webpage identifier may cause multiple contact webpage links 614 associated with that contact to be displayed. For example, a selection of the name "Steve Smith" of FIG. 6 may cause a "Work" link and a "Personal" link to be displayed. A selection of the "Work" link causes the web browser 225 to open a work webpage for the contact and a selection of the "Personal" link causes the web browser 225 to open the personal webpage for the contact.

In at least some example embodiments, the contact webpage links 614 in the web browser screen 600 may be physically separated from the user-defined links 514 and/or the preloaded links 510. For example, the web browser may provide access to user-defined links 514, preloaded links 510, and contact webpage links 614 through separate folders.

Prompting for Populating Web Browser

In some example embodiments, such as the example embodiment illustrated in FIG. 5, the web browser 225 may be automatically populated with a webpage identifier 360 after determining that the first contact entry includes a webpage identifier 360. That is, the web browser 225 may be populated without the need for further input from the user via an input interface 206.

Figure 7:
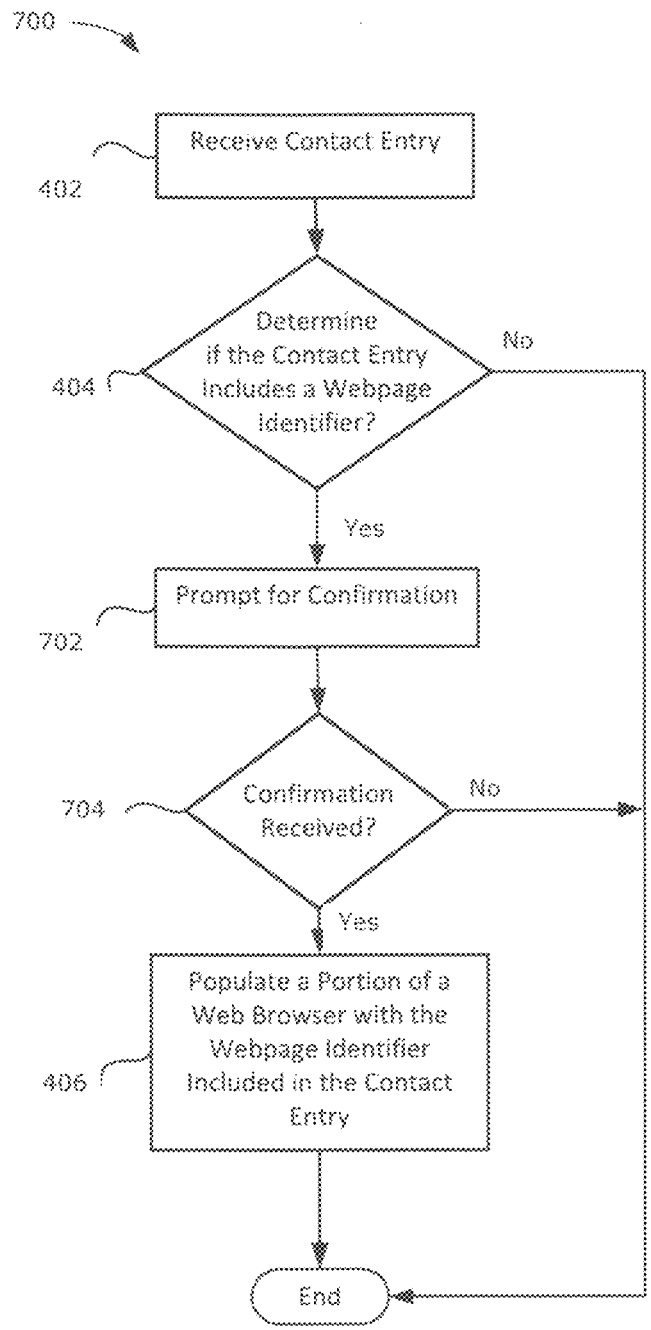
FIG. 7 is a flowchart illustrating an example method of facilitating access to a webpage associated with a contact in accordance with example embodiments of the present disclosure.

In other example embodiments, further user input may be required from a user via an input interface 206 in order to populate the web browser 225 with the webpage identifier 361. Referring now to FIG. 7, one such example embodiment is illustrated. In FIG. 7, a flowchart of a further method 700 for facilitating access to a webpage associated with a contact is illustrated.

The electronic device 201 may be configured to perform the method 700 of FIG. 7. In at least some example embodiments, the processor 240 of the electronic device 201 is configured to perform the method 700 of FIG. 7. One or more applications 224 on the electronic device 201 may contain computer readable instructions which cause the processor 240 of the electronic device 201 to perform the method 700 of FIG. 7. In at least some example embodiments, any one or more of the contact manager 226, the webpage browser 225 and/or the web browser injection module 229 stored in memory of the electronic device 201 are configured to perform the method of FIG. 7. More particularly, the contact manager 226, the webpage browser 225 and/or the web browser injection module 229 may include computer readable instructions which, when executed, cause the processor 240 to perform the method of FIG. 7. It will be appreciated that the method of FIG. 7 may, in at least some example embodiments, be provided by other software applications or modules apart from those specifically discussed above; for example the operating system 222. Accordingly, any features which are referred to as being performed by the electronic device 201 may be performed by any one or more of the software applications or modules referred to above or other software modules.

In at least some example embodiments, at least some of the method of FIG. 7 may be performed by or may rely on other applications 224 or modules which interface with the contact manager 226, the webpage browser 225 and/or the web browser injection module 229. For example, the contact manager 226 and/or the web browser 225 may be equipped with an application programming interface (API) which allows other software or modules to access features of these applications 224.

The method 700 includes 402, 404 and 406 which are discussed in greater detail above with reference to FIG. 4. However, the method 700 includes 702 and 704 which are not depicted in FIG. 4. More particularly, after determining if the first contact entry 404 includes a webpage identifier 361, at 702, the electronic device 201 presents a prompt via an output interface of the electronic device 201 to request confirmation to populate the web browser 225 with the webpage identifier 361 determined at 404. The prompt may, in at least some example embodiments, be provided on a display 204 of the electronic device 201. The prompt may, in various example embodiments, ask the user to confirm, cancel, or modify the webpage identifier 361 or the display name which is to be used to identify the webpage associated with the webpage identifier 361.

Next, at 704, confirmation may be received via an input interface 206 associated with the electronic device 201. The input interface 206 may, for example, be a trackpad, trackball, keyboard, or touchscreen. In response to receiving confirmation at 704, the electronic device 201 populates a portion of the web browser 225 with the webpage identifier 360 in the manner described above with reference to 406 of FIG. 4. If, no confirmation is received at 704 (e.g. if the user instructs the electronic device 201 not to populate a portion of the web browser 225 with the webpage identifier 361), then the method 700 ends without populating a portion of the web browser 225 with the webpage identifier 361.

Using Contact Webpage Links

Figure 8:
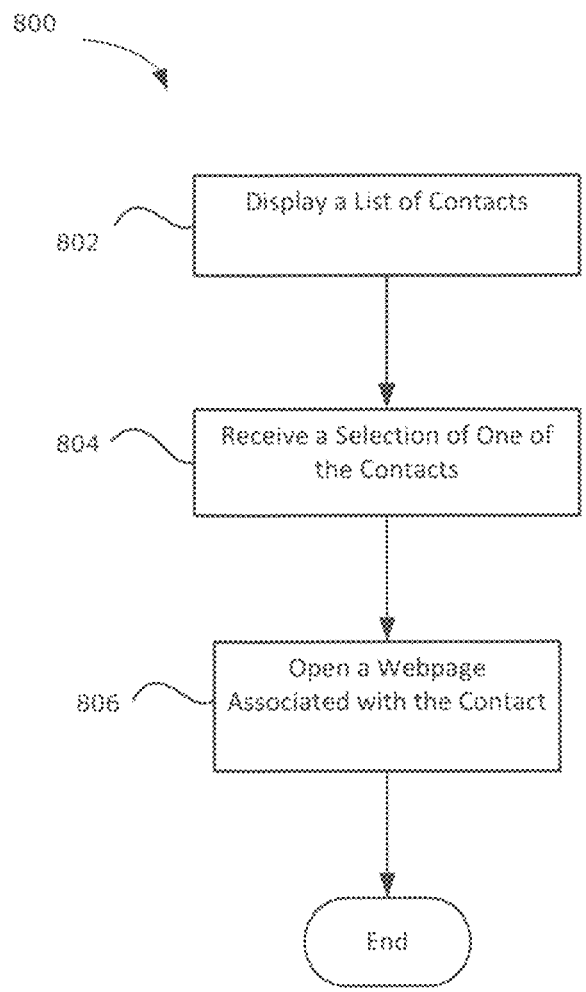
FIG. 8 is a flowchart illustrating an example method for retrieving a webpage associated with a contact.

Referring now to FIG. 8, at example method 800 for retrieving a webpage associated with a contact is illustrated in flowchart form. The electronic device 201 may be configured to perform the method 800 of FIG. 8. In at least some example embodiments, the processor 240 of the electronic device 201 is configured to perform the method of FIG. 8. One or more applications 224 on the electronic device 201 may contain computer readable instructions which cause the processor 240 of the electronic device 201 to perform any one or more of the method 800 of FIG. 8. In at least some example embodiments, any one or more of the contact manager 226, the webpage browser 225 and/or the web browser injection module 229 stored in memory of the electronic device 201 are configured to perform the method of FIG. 8. More particularly, the contact manager 226, the webpage browser 225 and/or the web browser injection module 229 may include computer readable instructions which, when executed, cause the processor 240 to perform the method of FIG. 8. The method of FIG. 8 may, in at least some example embodiments, be provided by other software applications or modules apart from those specifically discussed above; for example the operating system 222. Accordingly, any features which are referred to as being performed by the electronic device 201 may be performed by any one or more of the software applications or modules referred to above or other software modules.

In at least some example embodiments, at least some of the method 800 may be performed by or may rely on other applications 224 or modules which interface with the contact manager 226, the webpage browser 225 and/or the web browser injection module 229. For example, the contact manager 226 and/or the web browser 225 may be equipped with an application programming interface (API) which allows other software or modules to access features of these applications 224.

The method 800 includes, at 802, displaying a list of contacts associated with webpage identifiers. The contacts may be displayed as a list and may be identified using a name associated with a contact entry which also contained a webpage identifier. For example, the name may include the personal name 311 of an individual associated with that contact entry and/or the name of a company 331 associated with that contact entry. The list of contacts may be displayed in a graphical user interface area in the web browser 225 in the manner described above with reference to FIG. 6

The contacts may be selected by an input interface 206 associated with the electronic device 201. That is, the displayed name associated with a contact (which may be a personal name or a company name) may be selected at 804 by an input interface 206. The input interface 206 may, for example, be a trackpad, trackball, keyboard or touchscreen.

At 804, in response to receiving a selection of one of the contacts (i.e. a name), the web browser 225 opens a webpage associated with the contact at 806. At 804 the web browser 225 may attempt to retrieve a webpage using a webpage identifier (i.e. an address such as a URL) which was defined in the same contact entry which contained the displayed name which was selected at 804.

While the present application is primarily described in terms of methods, a person of ordinary skill in the art will understand that the present application is also directed to various apparatus such as an electronic device including a mobile communications device. The electronic device includes components for performing at least some of the aspects and features of the described methods, be it by way of hardware components (such as the memory 244 and/or the processor 240), software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method implemented by a processor of an electronic device, comprising:
    obtaining a first contact entry;
    storing the first contact entry as a record in an address book in memory on the electronic device;
    determining if the first contact entry stored as the record in the address book includes a webpage identifier by determining whether the first contact entry includes a webpage identifier field that is populated with a webpage identifier; and
    if the first contact entry includes a webpage identifier field that is populated with a webpage identifier, populating a persistent portion of a web browser with a selectable link associated with the webpage identifier included in the first contact entry, the selectable link being identifiable by a name in the first contact entry.

2. The method of claim 1, wherein populating the persistent portion of the web browser with the selectable link comprises storing the webpage identifier in a memory store associated with the web browser.

3. The method of claim 1, further comprising:
    obtaining a second contact entry;
    determining if the second contact entry includes a second webpage identifier field that is populated with a second webpage identifier; and
    if the second contact entry includes a second webpage identifier field that is populated with a second webpage identifier, populating a persistent portion of the web browser with a second selectable link associated with the second webpage identifier included in the second contact entry, the second selectable link being identifiable by a name in the second contact entry.

4. The method of claim 1, wherein the webpage identifier identifies a work webpage or a personal webpage associated with a contact.

5. The method of claim 1, wherein populating a persistent portion of the web browser with a selectable link associated with the webpage identifier included in the first contact entry comprises:
    determining if the contact entry includes a personal name and, if so, using the personal name as a display name for the link; and
    if the contact entry does not include a personal name, determining if the contact entry includes a company name and, if so, using the company name as a display name for the link.

6. The method of claim 1, wherein populating a persistent portion of the web browser with a selectable link associated with the webpage identifier included in the first contact entry comprises:
    determining if the contact entry includes a company name and, if so, using the company name as a display name for the link; and
    if the contact entry does not include a company name, determining if the contact entry includes a personal name and, if so, using the personal name as a display name for the link.

7. The method of claim 1, wherein the web browser comprises a graphical user interface for accessing one or more user-defined links and one or more links created based on contact entries, and wherein populating the portion of the web browser with the webpage identifier comprises configuring the graphical user interface to include a link to a webpage associated with the webpage identifier.

8. The method of claim 7, wherein configuring the graphical user interface to include the link comprises configuring the graphical user interface to identify the link to a webpage associated with a webpage identifier using a name associated with the contact entry which included that webpage identifier.

9. The method of claim 8, wherein configuring the graphical user interface to identify the link comprises:
    configuring the web browser to display the name associated with the contact entry and to associate that name with the webpage identifier which is associated with the same contact entry so that selection of the name causes the web browser to open a webpage located at a location specified by the webpage identifier associated with that name.

10. The method of claim 8, wherein the name is a name of an individual associated with the contact entry.

11. The method of claim 8, wherein the name is a name of a company associated with the contact entry.

12. The method of claim 1, wherein determining if the first contact entry includes a webpage identifier comprises determining if the first contact entry includes a plurality of webpage identifiers and, if so, populating a portion of the web browser with the plurality of webpage identifiers included in the first contact entry.

13. The method of claim 1, wherein the electronic device comprises a communication subsystem and wherein obtaining the contact entry comprises receiving the contact entry via the communication subsystem.

14. The method of claim 1, wherein the electronic device further comprises an output interface and an input interface, and wherein the method further comprises, prior to populating:
    presenting a prompt via the output interface requesting confirmation to populate the portion of the web browser with the webpage identifier; and
    if confirmation is received from the input interface, populating the portion of the web browser with the webpage identifier.

15. The method of claim 1 wherein the webpage identifier is an address associated with a webpage.

16. An electronic device comprising:
    a memory; and
    a processor coupled with the memory, the processor being configured to:
        obtain a first contact entry;
        store the first contact entry as a record in an address book in the memory on the electronic device;
        determine if the first contact entry stored as the record in the address book includes a webpage identifier by determining whether the first contact entry includes a webpage identifier field that is populated with a webpage identifier; and
        if the first contact entry includes a webpage identifier field that is populated with a webpage identifier, populate a persistent portion of a web browser with a selectable link associated with the webpage identifier included in the first contact entry, the selectable link being identifiable by a name in the first contact entry.

17. The electronic device of claim 16, wherein the electronic device is a mobile communications device.

* * * * *